(12) United States Patent  (10) Patent No.: US 12,677,250 B2
Fu  (45) Date of Patent: Jul. 7, 2026

(54) NOTIFICATION MESSAGE REMINDER METHOD, NOTIFICATION MESSAGE REMINDER APPARATUS, AND ELECTRONIC DEVICE

(71) Applicant: VIVO MOBILE COMMUNICATION CO., LTD., Dongguan (CN)

(72) Inventor: Shengsheng Fu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 331 days.

(21) Appl. No.: 18/229,164

(22) Filed: Aug. 1, 2023

(65) Prior Publication Data

US 2023/0379873 A1     Nov. 23, 2023

Related U.S. Application Data

(63) Continuation of application No. PCT/CN2022/075046, filed on Jan. 29, 2022.

(30) Foreign Application Priority Data

Feb. 2, 2021   (CN) ........................ 202110145203.X

(51) Int. Cl.
*H04W 68/00*     (2009.01)
*H04B 7/06*      (2006.01)
(52) U.S. Cl.
CPC ........ *H04W 68/005* (2013.01); *H04B 7/0617* (2013.01)

(58) Field of Classification Search
CPC .............. H04W 68/005; H04B 7/0617; H04M 1/0264; H04M 1/72403
See application file for complete search history.

(56) References Cited

U.S. PATENT DOCUMENTS

2010/0167785 A1*   7/2010   Liu ...................... H04M 1/0202
                                                  455/575.1
2011/0212717 A1*   9/2011   Rhoads ............... G06F 16/9537
                                                  455/418
(Continued)

FOREIGN PATENT DOCUMENTS

CN        101420707 A      4/2009
CN        101695083 A      4/2010
(Continued)

OTHER PUBLICATIONS

Extended European Search Report issued in related European Application No. 22749177.6, mailed Jul. 1, 2024, 8 pages.
(Continued)

*Primary Examiner* — Kenneth T Lam
(74) *Attorney, Agent, or Firm* — IPX PLLC

(57)     ABSTRACT
A notification message reminder method, a notification message reminder apparatus, and an electronic device are provided. The notification message reminder method is performed by a mobile terminal. The mobile terminal includes a pan-tilt module, and the pan-tilt module is provided with a lens. The method includes: receiving a first notification message; and controlling the lens to move according to a target reminder scheme corresponding to a target application, where the target application is an application corresponding to the first notification message.

15 Claims, 6 Drawing Sheets

US 12,677,250 B2

Page 2

(56)     References Cited

U.S. PATENT DOCUMENTS

2016/0171871 A1*  6/2016  Zhang ................. G08B 3/1008
                                                     340/4.31
2016/0274375 A1*  9/2016  Park ...................... G02B 27/64
2024/0305782 A1*  9/2024  Zhang ................... H04N 19/70

FOREIGN PATENT DOCUMENTS

| CN | 102348020 | A | 2/2012 |
|---|---|---|---|
| CN | 104580692 | A | 4/2015 |
| CN | 105278515 | A | 1/2016 |
| CN | 106488413 | A | 3/2017 |
| CN | 106774128 | A | 5/2017 |
| CN | 104935717 | B | 1/2018 |
| CN | 109005254 | A | 12/2018 |
| CN | 109547600 | A | 3/2019 |
| CN | 109670293 | A | 4/2019 |
| CN | 111246013 | A | 6/2020 |
| CN | 111929971 | A | 11/2020 |
| CN | 112929484 | A | 6/2021 |
| JP | 2008028434 | A | 2/2008 |
| JP | 2008294712 | A | 12/2018 |

OTHER PUBLICATIONS

Notice of Reason for refusal issued in related Japanese Application No. 2023-545868, mailed Jun. 24, 2024, 3 pages.
International Search Report issued in corresponding International Application No. PCT/CN2022/075046, mailed Apr. 28, 2022, 4 pages.
First Office Action issued in corresponding CN Patent Application No. 202110145203.X, dated Oct. 29, 2021, 8 pages.
Second Office Action issued in corresponding CN Patent Application No. 202110145203.X, dated Apr. 13, 2022, 7 pages.

* cited by examiner

Receive a first notification message                    110

Control a lens to move according to a target reminder scheme
corresponding to a target application                    120

510

First receiving module

520

First processing module

600

Electronic device

610

Memory

620

Processor

NOTIFICATION MESSAGE REMINDER METHOD, NOTIFICATION MESSAGE REMINDER APPARATUS, AND ELECTRONIC DEVICE

CROSS-REFERENCE TO RELATED APPLICATIONS

This application is a continuation of International Application No. PCT/CN2022/075046, filed Jan. 29, 2022, which claims priority to Chinese Patent Application No. 202110145203.X, filed Feb. 2, 2021. The entire contents of each of the above-referenced applications are expressly incorporated herein by reference.

TECHNICAL FIELD

This application relates to the field of communication technologies, and specifically, to a notification message reminder method, a notification message reminder apparatus, and an electronic device.

BACKGROUND

When a mobile terminal receives a notification message of an application, the mobile terminal reminds a user in a manner such as ringing or vibrating. For example, in a vibrate mode, every time a mobile phone receives a call, the mobile phone vibrates for reminding. In some scenarios (for example, a meeting), the mobile terminal of the user needs to keep silent, however, the user still needs to check a notification message. In the prior art, a silent reminder is implemented by turning on a screen, however, turning on the screen attracts attention of others.

SUMMARY

Embodiments of this application are intended to provide a notification message reminder method, a notification message reminder apparatus, and an electronic device.

According to a first aspect, an embodiment of this application provides a notification message reminder method, applied to a mobile terminal, where the mobile terminal includes a pan-tilt module, the pan-tilt module is provided with a lens, and the method includes:

receiving a first notification message; and controlling the lens to move according to a target reminder scheme corresponding to a target application, where the target application is an application corresponding to the first notification message.

According to a second aspect, an embodiment of this application provides a notification message reminder apparatus, applied to a mobile terminal, where the mobile terminal includes a lens pan-tilt module, and the apparatus includes:

a first receiving module, configured to receive a first notification message; and a first processing module, configured to control a lens to move according to a target reminder scheme corresponding to a target application, where the target application is an application corresponding to the first notification message.

According to a third aspect, an embodiment of this application provides an electronic device, where the electronic device includes a processor, a memory, and a program or instructions stored in the memory and capable of running on the processor, where when the program or the instructions are executed by the processor, the steps of the method according to the first aspect are implemented.

According to a fourth aspect, an embodiment of this application provides a readable storage medium, where the readable storage medium stores a program or instructions, and when the program or the instructions are executed by a processor, the steps of the method according to the first aspect are implemented.

According to a fifth aspect, an embodiment of this application provides a chip, where the chip includes a processor and a communications interface, the communications interface is coupled to the processor, and the processor is configured to run a program or instructions to implement the method according to the first aspect.

In the embodiments of this application, the lens installed on the pan-tilt module moves to implement a message reminder, which implements a brand-new lens interaction, attracts less attention of others, and has good privacy.

DETAILED DESCRIPTION

The following describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts shall fall within the protection scope of this application.

The terms "first", "second", and the like in the specification and claims of this application are used to distinguish between similar objects rather than to describe a specific order or sequence. It should be understood that data used in this way may be interchangeable in appropriate cases, so that the embodiments of this application can be implemented in a sequence other than those shown or described herein. In addition, in the specification and claims, "and/or" represents at least one of connected objects, and the character "/" generally represents an "or" relationship between associated objects.

The following describes in detail a notification message reminder method, a notification message reminder apparatus, an electronic device, and a readable storage medium by using embodiments and application scenarios thereof with reference to the accompanying drawings.

The notification message reminder method may be applied to a mobile terminal, and may be performed by, but not limited to, hardware or software in the mobile terminal. The notification message reminder method may be performed by the mobile terminal or a control apparatus of the mobile terminal.

The embodiments of this application provide the notification message reminder method. The notification message reminder method may be performed by the mobile terminal, including but not limited to the mobile terminal, the control apparatus of the mobile terminal, and the like.

An embodiment of this application provides a notification message reminder method, applied to a mobile terminal. The mobile terminal includes a lens pan-tilt module, and the lens pan-tilt module includes a pan-tilt installed on the whole machine and a lens installed on the pan-tilt. The pan-tilt may be electrically controlled, for example, the lens pan-tilt module includes a motor for driving the lens to move.

Figure 1:
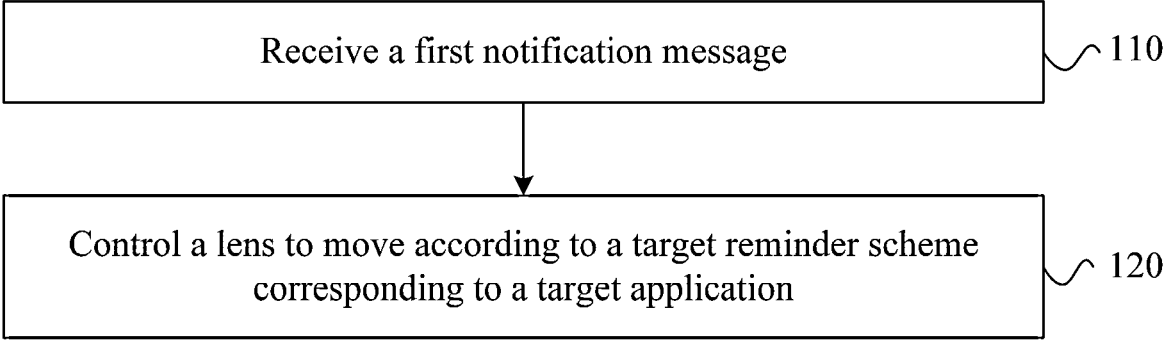
FIG. 1 is a first flowchart of a notification message reminder method according to an embodiment of this application.

As shown in FIG. 1, the notification message reminder method includes step 110 and step 120.

Step 110: Receive a first notification message.

The first notification message includes but is not limited to: an incoming call notification, a short message notification, a social application notification, a clock application notification, a music application notification, or other application notifications.

The incoming call notification is used as an example. When receiving an incoming call, the mobile terminal receives a corresponding notification message.

The social application notification is used as an example. When a user receives a message from a contact, the mobile terminal receives a corresponding notification message.

The clock application notification is used as an example. If the user sets an alarm clock, the mobile terminal receives a corresponding notification message when a target moment is reached.

The music application notification is used as an example. If the user sets a notification for reminding that an album is open for purchase, the mobile terminal receives a corresponding notification message when the album is open for purchase.

Corresponding examples of other types are not provided one by one.

In this embodiment of this application, when the first notification message is received, it is not necessary to ring or vibrate to remind as in the related art, but to implement a silent reminder by moving the lens when a preset condition is met.

Step 120: Control the lens to move according to a target reminder scheme corresponding to a target application, where the target application is an application corresponding to the first notification message.

In other words, when the first notification message is received, it is determined whether the application corresponding to the first notification message is in a target application list.

It can be understood that a silent reminder mode is preset for the target application, and the silent reminder mode includes the target reminder scheme corresponding to the target application, and the target reminder scheme is a movement scheme of the lens.

In this way, when the first notification message of the target application is received, the user may be notified of a type (a corresponding target application) of the current first notification message by controlling the lens to move according to the target reminder scheme, thereby implementing a silent and private reminder.

It should be noted that the pan-tilt module mentioned in this application may be a micro pan-tilt. This module has functions such as flexible rotating, shaking, and displacing, and can flexibly respond to various complex scenarios and notification reminders of various applications. In addition, the lens hardly produces any noise during rotation and displacement, which is very suitable for a scenario requiring high silence, such as a meeting.

According to the notification message reminder method provided in this embodiment of this application, the lens installed on the pan-tilt module moves to implement a message reminder, which implements a brand-new lens interaction, attracts less attention of others, and has good privacy.

In some embodiments, the step 120: control the lens to move according to a target reminder scheme corresponding to a target application includes: in a case that the lens is facing upward, controlling the lens to move according to the target reminder scheme corresponding to the target application.

In other words, when the first notification message is received, it needs to first determine a posture of the lens installed on the pan-tilt module.

The posture of the lens installed on the pan-tilt module may be determined in various manners.

First, a posture of the mobile terminal may be determined by a gyroscope.

For example, the lens installed on the pan-tilt module is set on a side of the mobile terminal away from a screen. When a control apparatus determines, based on a signal of the gyroscope, that the screen of the mobile terminal is facing downward, the lens installed on the pan-tilt module is determined to face upward.

For example, in a meeting scenario, the screen of the mobile terminal is placed downward on a desktop, and the lens installed on the pan-tilt module is set on the back of the mobile terminal. In this case, if the first notification message is received, the lens can move to provide a silent and private reminder for the user to determine whether to check the first notification information.

Second, the posture of the mobile terminal is determined by an optical sensor.

For example, the lens installed on the pan-tilt module is set on the side of the mobile terminal away from the screen, and a side in which the screen of the mobile terminal is located is provided with the optical sensor.

In a case that the screen of the mobile terminal is placed downward, for example, the screen of the mobile terminal is placed on the desktop, when a controller determines, based on a signal of the optical sensor, that the screen of the mobile terminal is facing downward, the lens installed on the pan-tilt module is determined to face upward.

Third, the posture of the mobile terminal is comprehensively determined based on signals of a plurality of sensors.

For example, the posture of the mobile terminal is determined by combining signals of the gyroscope and the optical sensor.

It can be understood that when the lens installed on the pan-tilt module is determined to face upward, it is practically meaningful to remind the user through the movement of the lens.

Particularly, in a case that the lens installed on the pan-tilt module is set on the side of the mobile terminal away from the screen, in a case that the screen of the mobile terminal is placed downward, it can be perfectly conveyed to others that the user is not operating and paying attention to information of a mobile phone at present.

In addition, not every notification message requires the attention of the user in a target scenario. The application corresponding to the first notification message is determined as the target application, which can first exclude an application that the user does not pay attention to.

In a case that at least two conditions are met: the lens installed on the pan-tilt module is facing upward and the application corresponding to the first notification message is the target application, the user may be notified of the type (the corresponding target application) of the current first notification message by controlling the lens to move according to the target reminder scheme, thereby implementing the silent and private reminder.

In some embodiments, the step 120: control the lens to move according to a target reminder scheme corresponding to a target application includes: in a case that the mobile terminal is in a silent reminder state, controlling the lens to move according to the target reminder scheme corresponding to the target application.

In addition, the method may further include: in a case that the mobile terminal is in a non-silent reminder state, outputting prompt information according to a target prompt manner.

It should be noted that the mobile terminal may include a plurality of reminder modes, including but not limited to: a silent mode, a silent reminder mode, a vibration reminder mode, a ringing reminder mode, and the like.

In a case that the mobile terminal is set to be in the silent reminder mode, when the first notification message is received, the lens is controlled to move according to the target reminder scheme corresponding to the target application.

In a case that the mobile terminal is set to be in the vibration reminder mode, when the first notification message is received, a vibration reminder is outputted.

In a case that the mobile terminal is set to be in the ringing reminder mode, when the first notification message is received, a ring reminder is outputted.

In a case that the mobile terminal is set to be in the silent mode, when the first notification message is received, there is no reminder or the lens is not controlled to move.

In some embodiments, before the step 110: receive a first notification message, the notification message reminder method may further include:

receiving a first input of a user.

In this step, the first input is used to select the target application.

The first input may be expressed in at least one of the following manners.

First, the first input may be expressed as a touch input, including but not limited to a tap input, a slide input, a press input, and the like.

In this implementation, receiving the first input of the user may be expressed as receiving a touch operation of the user on a display area of a display screen of the mobile terminal.

For example, the first input may include: an operation of tapping a target application in an application list in a case that a silent reminder setting interface is displayed.

Second, the first input may be expressed as a physical button input.

In this implementation, a body of the mobile terminal is provided with a physical button corresponding to a selection or a determination. Receiving the first input of the user may be expressed as receiving the first input of the user pressing the corresponding physical button, and the first input may also be a combined operation of pressing a plurality of physical buttons at the same time.

Third, the first input may be expressed as a voice input.

In this implementation, when receiving a voice such as "setting WeChat to be silently reminded", a terminal may be triggered to set WeChat as the target application.

In another embodiment, the first input may also be expressed in another form, including but not limited to a character input or the like, which can be determined according to actual needs, and is not limited in this embodiment of this application.

The target application is determined in response to the first input.

When the first input is received, at least one application is selected as the target application.

It should be noted that the first input may select one or more applications.

In some embodiments, corresponding to a social application, one or more target contacts in a target social application may also be selected for enabling a silent reminder permission. In addition, different reminder schemes may also be set for different contacts in a same target social application.

A second input of the user is received.

In this step, the second input is used for the target reminder scheme associated with the target application.

The second input may be expressed in at least one of the following manners.

First, the second input may be expressed as a touch input, including but not limited to a tap input, a slide input, a press input, and the like.

In this implementation, receiving the second input of the user may be expressed as receiving the touch operation of the user on the display area of the display screen of the mobile terminal.

For example, the second input may include: tapping a corresponding reminder scheme in a case that a reminder scheme selection interface is displayed.

The reminder scheme may include: movement, rotation, or shake.

In some embodiments, the reminder scheme may include parameters such as a cycle or time of a movement.

Second, the second input may be expressed as a physical button input.

In this implementation, a body of the mobile terminal is provided with a physical button corresponding to a selection and a determination. Receiving the second input of the user may be expressed as receiving the second input of the user pressing the corresponding physical button, and the second input may also be a combined operation of pressing a plurality of physical buttons at the same time.

Third, the second input may be expressed as a voice input.

In this implementation, when receiving a voice such as "rotating the lens 5 turns", the terminal may trigger the target application to control, in the silent reminder mode and when a reminder condition is met, the lens to rotate 5 turns.

In another embodiment, the second input may also be expressed in another form, including but not limited to a character input or the like, which can be determined according to actual needs, and is not limited in this embodiment of this application.

The target reminder scheme associated with the target application is determined in response to the second input.

When the second input is received, an association relationship between the target application and the target reminder scheme is established when the target application can be set.

It should be noted that a corresponding target reminder scheme may be set for one target application each time, or a same target reminder scheme may be set for a plurality of applications. In some embodiments, different corresponding target reminder schemes may also be set for different contacts in one target application. This is not specifically limited in this embodiment of this application.

In some embodiments, the target reminder scheme includes at least one of the following.

First, the lens moves according to a target trajectory.

In this embodiment, a motion mode of the lens is movement, and a moving trajectory may be preset, such as moving along a length direction of the mobile terminal, moving along a width direction of the mobile terminal, or moving along a diagonal direction of the mobile terminal.

Different motion trajectories may correspond to different target applications, or correspond to different contacts.

In this way, a plurality of different reminder scenarios can be distinguished through the movement of the lens, and more information can be conveyed to the user through the movement of the lens.

Second, the lens rotates according to a target angle.

In this embodiment, the motion mode of the lens is rotation, and a rotation angle may be preset, such as rotating 720° clockwise (2 turns clockwise), or rotating 1440° clockwise (4 turns clockwise), or rotating 720° counterclockwise (2 turns counterclockwise).

In this way, a plurality of different reminder scenarios can be distinguished through the rotation of the lens, and more information can be conveyed to the user through the rotation of the lens.

Third, the lens shakes according to the target angle.

In this embodiment, the motion mode of the lens is shake, and a shaking angle may be preset, such as shaking with a range of 15° or shaking with a range of 45°.

In this way, a plurality of different reminder scenarios can be distinguished through the shaking of the lens, and more information can be conveyed to the user through the shaking of the lens.

The foregoing three motion modes may be used independently or may be used in combination.

In some embodiments, controlling the lens to move according to the target reminder scheme includes controlling the lens to execute, according to the target reminder scheme, in one of the following cycles:

1. Stop after cycling a target number of times.

In this embodiment, the target number of times of cycling may be one time or a plurality of times.

For example, the lens is set to rotate 2 turns clockwise twice for a WeChat notification message. In the silent reminder mode, if the WeChat notification message is received and the lens installed on the pan-tilt module is facing upward, the lens is controlled to rotate 4 turns clockwise.

In some embodiments, if an input of the user for turning off the silent reminder is received during the rotation of the lens, the lens stops rotating.

2. Stop after lasting for a target time.

In this embodiment, a stop signal of the movement of the lens is that a movement time reaches the target time.

For example, the lens is set to shake continuously for 10 s for the WeChat notification message. In the silent reminder mode, if the WeChat notification message is received and the lens installed on the pan-tilt module is facing upward, the lens is controlled to shake for 10 s.

In some embodiments, if the input of the user for turning off the silent reminder is received during the shaking of the lens, the lens stops shaking.

3. Stop after continuously cycling until a target input of the user is received.

In this embodiment, the stop signal of the movement of the lens is that the target input of the user is received.

For example, the lens is set to shake for the WeChat notification message. In the silent reminder mode, if the WeChat notification message is received and the lens installed on the pan-tilt module is facing upward, the lens is controlled to continuously shake until the target input of the user for turning off the silent reminder is received, and then the lens stops shaking.

The target input includes but is not limited to: an operation of picking up the mobile terminal by the user or an operation of pressing a screen lock button by the user.

4. Pause after cycling a target number of times, and restart after a target time period.

In this embodiment, the lens moves in a plurality of cycles, and after each cycle of movement ends, the movement pauses for the target time period and then restarts.

For example, the lens is set to shake continuously for 10 s and pause for 20 s for the WeChat notification message. In the silent reminder mode, if the WeChat notification message is received and the lens installed on the pan-tilt module is facing upward, the lens is controlled to shake for 10 s, then pause for 20 s, and then the lens is controlled to shake for 10 s again.

In some embodiments, if the input of the user for turning off the silent reminder is received during the shaking or pausing of the lens, the lens stops shaking.

The foregoing four cycles may be combined with the foregoing three motion modes, so that the user can set a symbolic target reminder scheme for the target application according to needs. In a case that the user does not look at the screen, more information can be conveyed to the user through the shaking of the lens.

Figure 2:
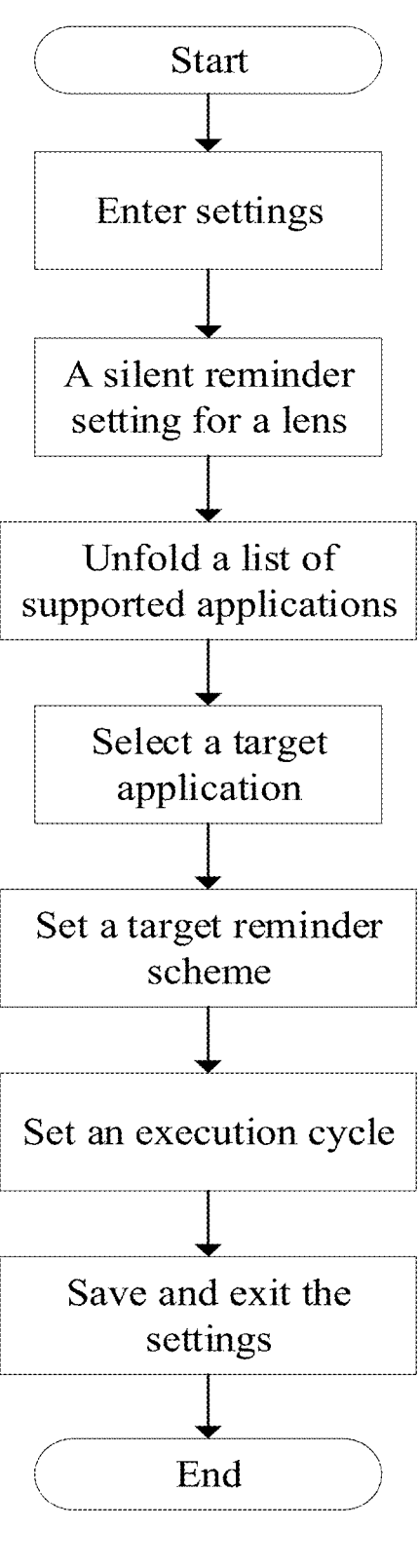
FIG. 2 is a second flowchart of a notification message reminder method according to an embodiment of this application.

The following describes, with reference to FIG. 2, a method for setting the target reminder scheme in the embodiments of this application.

As shown in FIG. 2, when starting to set the silent reminder, a system setting interface may be entered, and a silent reminder setting for a lens is selected. In this case, a silent reminder setting interface may display a plurality of controls. A control of the target application is selected by tapping, and a list of supported applications is unfolded. The list of supported applications may include authorized applications, such as displaying Phone, Messages, WeChat, QQ, and other applications that support prompts. The target application is selected. If the user checks one application, a subsequent setting is performed only on the application. If the user checks a plurality of applications, the subsequent setting takes effect for all checked applications. The target reminder scheme is set, and the target reminder scheme includes: rotating a specific number of turns, shaking at a specific angle, and drawing a user-defined lens displacement scheme. An execution cycle is set, including setting the cycle as: executing one time, executing a plurality of times, continuous cycling, automatic stopping after cycling a specific number of times, repeatedly executing after a time period, and the user saves and exits the settings.

It should be noted that the premise of performing the notification message reminder method in this application is that the silent reminder mode is turned on.

In some embodiments, in a case that the lens installed on the pan-tilt module is facing upward and the application corresponding to the first notification message is the target application, the step 120: control the lens to move according to a target reminder scheme includes:

in a case that the lens installed on the pan-tilt module is facing upward, determining that the application corresponding to the first notification message is the target application;

obtaining the target reminder scheme corresponding to the target application; and controlling the lens to move according to the target reminder scheme.

In other words, the method includes a plurality of determinations. It may first be determined whether the lens installed on the pan-tilt module is facing upward. Such determination is simple, which is convenient to quickly exclude a scenario in which the lens is facing downward.

In a case that the lens installed on the pan-tilt module is facing upward, the application corresponding to the first notification message is determined as the target application, and a list of applications with a silent reminder setting may be directly traversed. If the application corresponding to the first notification message is in the list, a corresponding target reminder scheme is directly read, and the lens is controlled to move according to the target reminder scheme. If the lens installed on the pan-tilt module is not facing upward, the procedure is directly ended. If the application corresponding to the first notification message is not the target application, the procedure is directly ended.

Figure 3:
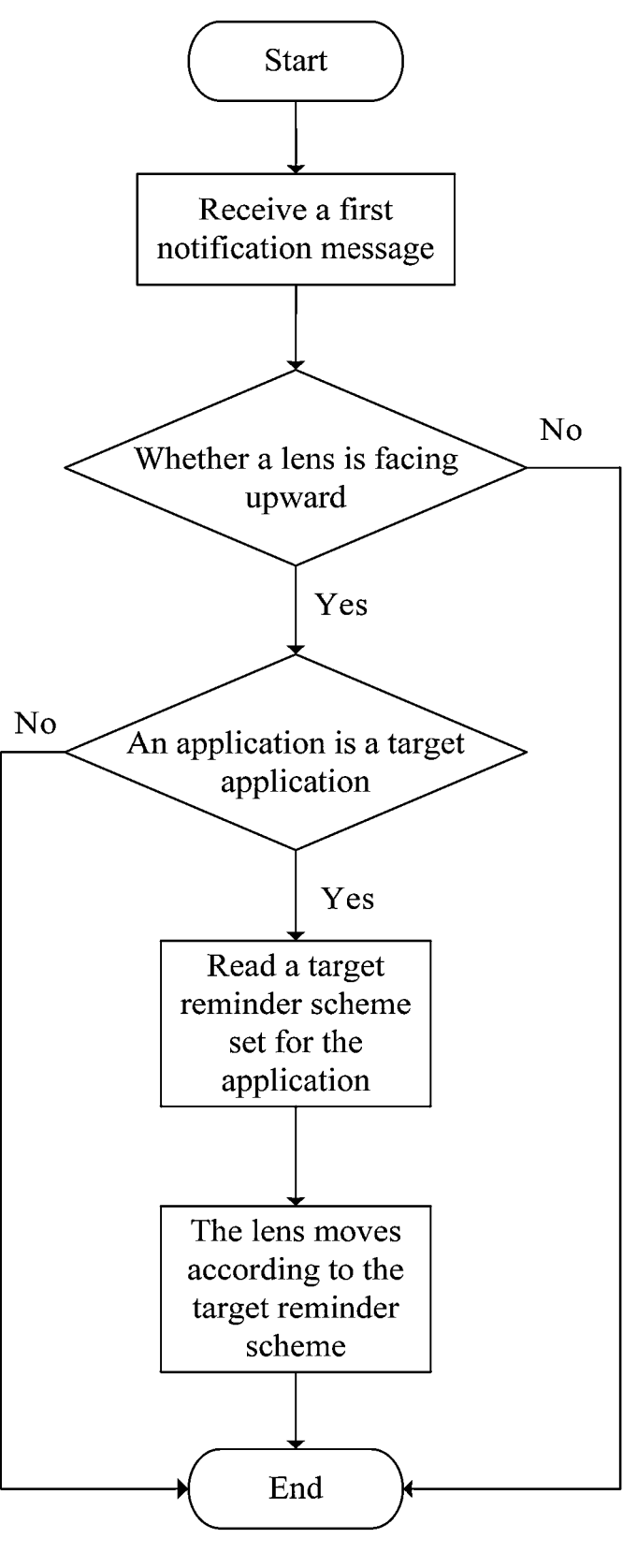
FIG. 3 is a third flowchart of a notification message reminder method according to an embodiment of this application.
Figure 4:
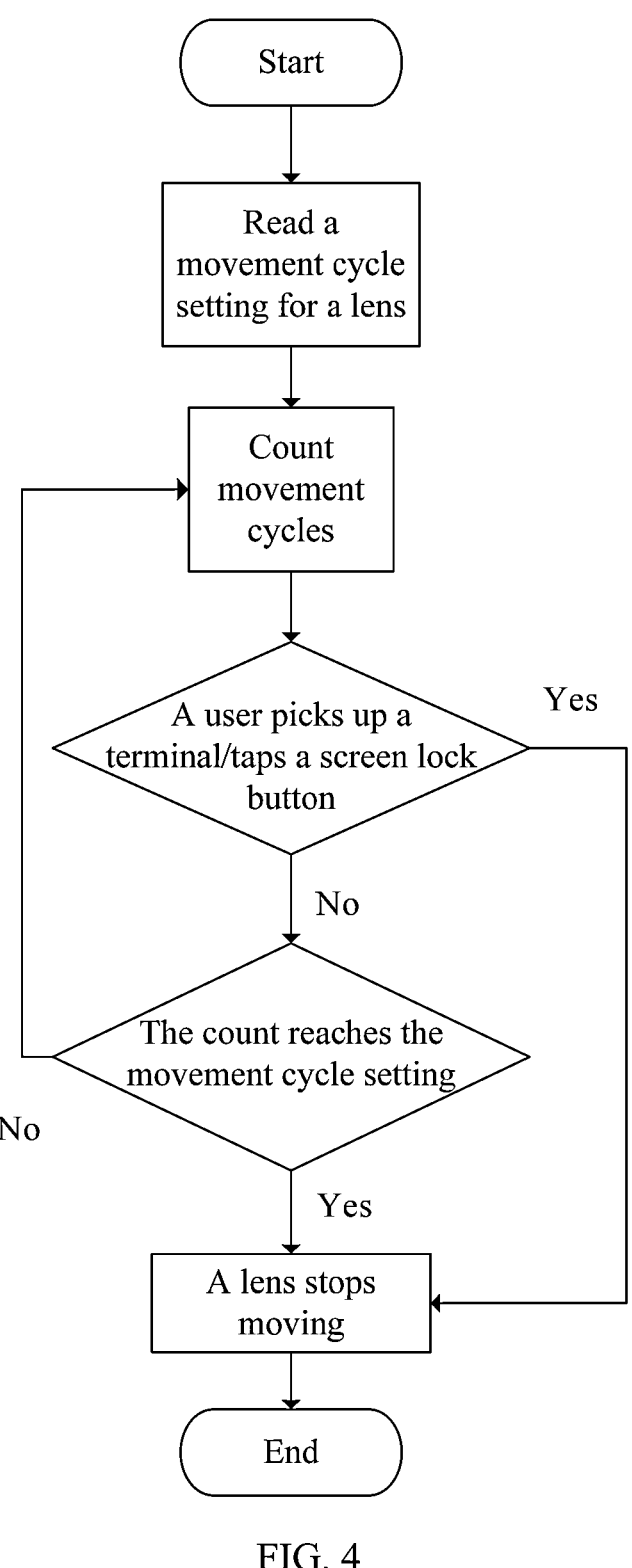
FIG. 4 is a fourth flowchart of a notification message reminder method according to an embodiment of this application.

The following describes an embodiment of this application with reference to FIG. 3 and FIG. 4.

As shown in FIG. 3, in a case that a silent reminder mode is turned on, a first notification message is received. It is determined whether a lens is facing upward. If the lens is not facing upward, the procedure is directly ended. If the lens is facing upward, it is determined whether an application corresponding to the first notification message is a target application. If the application is not the target application, the procedure is directly ended. If the application is the target application, a target reminder scheme set for the application is read. Then, the lens is controlled to move according to the target reminder scheme.

After the lens is controlled to move according to the target reminder scheme, it may be determined, by using the following method, whether to end the procedure.

As shown in FIG. 4, a movement cycle setting for a lens is read. In a case that a number of times of lens movement cycling is finite, movement cycles are counted. A lens movement is automatically stopped after the movement cycles are executed for the number of times without interruption. A user picks up a terminal/taps a screen lock button, for example, if the user picks up a mobile phone during the execution of the lens movement, the lens movement is terminated, or if the user performs a button operation during the execution of the lens movement, the lens movement is terminated. If the operation of picking up the terminal/tapping the screen lock button by the use is not received, the lens is controlled to stop moving when the count reaches the movement cycle setting.

In some other embodiments, the notification message reminder method may further include: in a case of playing audio information, controlling the lens to move based on the audio information.

In actual execution, the lens may be controlled, based on the audio information, to shake or rotate.

For example, a speed, an amplitude, and the like of the shaking or rotation of the lens may be controlled based on a rhythm of the audio information; or the speed, the amplitude, and the like of the shaking or rotation of the lens are controlled based on a groove of the audio information; or the speed, the amplitude, and the like of the shaking or rotation of the lens are controlled based on output volume of the audio information; or the speed, the amplitude, and the like of the shaking or rotation of the lens are controlled based on a tone of the audio information.

In this way, the lens installed on a pan-tilt module can simulate the audio information, especially combined with a music player application. When the user plays music, a novel interaction can be implemented, which has a high commercial value.

It should be noted that the notification message reminder method provided in the embodiments of this application may be performed by a notification message reminder apparatus or a control module for performing loading of the notification message reminder method in the notification message reminder apparatus.

An embodiment of this application further provides a notification message reminder apparatus.

The reminder apparatus is applied to a mobile terminal, where the mobile terminal includes a lens pan-tilt module.

Figures 5, 6:
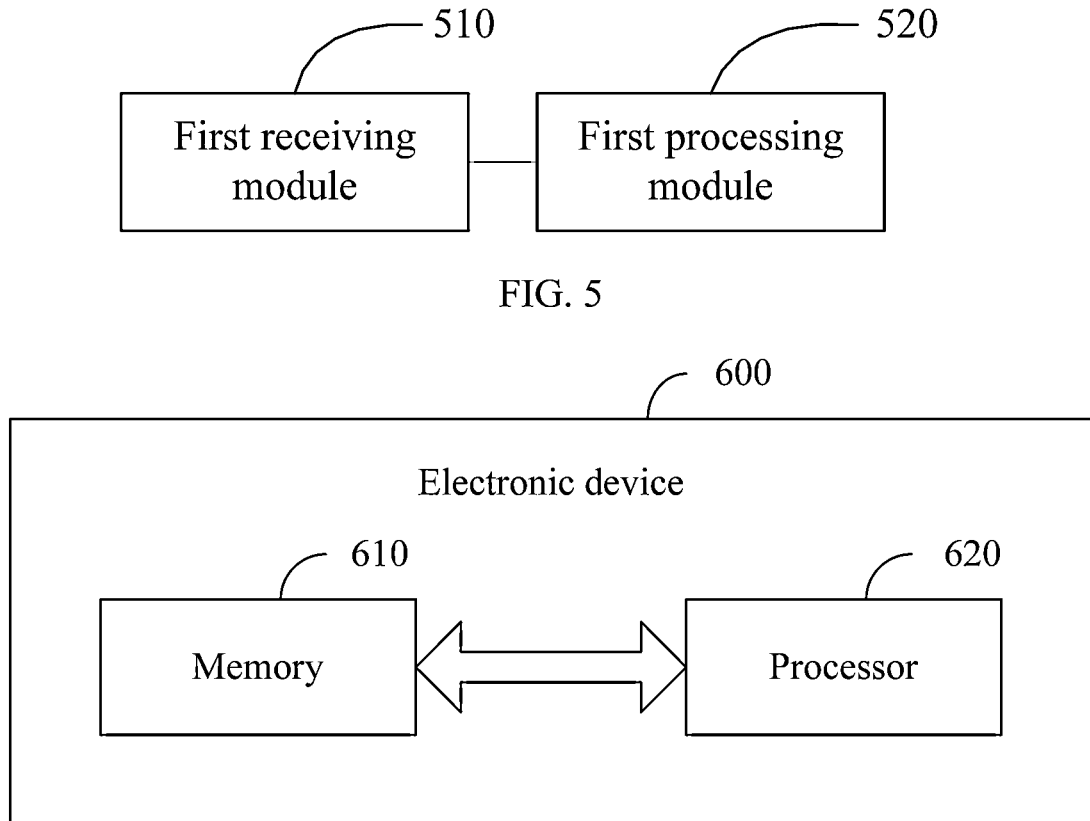
FIG. 5 is a structural diagram of a notification message reminder apparatus according to an embodiment of this application.
FIG. 6 is a first schematic structural diagram of an electronic device according to an embodiment of this application.

As shown in FIG. 5, the notification message reminder apparatus includes: a first receiving module 510 and a first processing module 520.

The first receiving module 510 is configured to receive a first notification message.

The first processing module 520 is configured to control a lens to move according to a target reminder scheme corresponding to a target application, where the target application is an application corresponding to the first notification message.

According to the notification message reminder apparatus provided in this embodiment of this application, the lens installed on the pan-tilt module moves to implement a message reminder, which implements a brand-new lens interaction, attracts less attention of others, and has good privacy.

In some embodiments, the first processing module 520 is further configured to: in a case that the lens is facing upward, control the lens to move according to the target reminder scheme corresponding to the target application.

In some embodiments, the first processing module 520 is further configured to: in a case that the mobile terminal is in a silent reminder state, control the lens to move according to the target reminder scheme corresponding to the target application; and in a case that the mobile terminal is in a non-silent reminder state, output prompt information according to a target prompt manner.

In some embodiments, the target reminder scheme includes at least one of the following.

The lens moves according to a target trajectory.

The lens rotates according to a target angle.

The lens shakes according to the target angle.

In some embodiments, the first processing module is further configured to control the lens to execute, according to the target reminder scheme, in one of the following cycles:

stopping after cycling a target number of times;

stopping after lasting for a target time;

stopping after continuously cycling until a target input of a user is received; or pausing after cycling a target number of times, and restarting after a target time period.

In some embodiments, the first processing module is further configured to:

in a case that the lens installed on the pan-tilt module is facing upward, determine that the application corresponding to the first notification message is the target application;

obtain the target reminder scheme corresponding to the target application; and control the lens to move according to the target reminder scheme.

In some embodiments, the reminder apparatus may further include:

a second receiving module, configured to receive a first input of the user;

a first determining module, configured to determine the target application in response to the first input;

a third receiving module, configured to receive a second input of the user; and a second determining module, configured to determine, in response to the second input, the target reminder scheme associated with the target application.

In some embodiments, the reminder apparatus may further include a second processing module, configured to: in a case of playing audio information, control the lens to move based on the audio information.

According to the notification message reminder apparatus provided in the embodiments of this application, the lens installed on the pan-tilt module moves to implement a message reminder, which implements a brand-new lens interaction, attracts less attention of others, and has good privacy.

The notification message reminder apparatus in the embodiments of this application may be an apparatus, or may be a component, an integrated circuit, or a chip in a mobile terminal. For example, the mobile terminal may be a mobile phone, a tablet computer, a notebook computer, a palmtop computer, a wearable device, an ultra-mobile personal computer (UMPC), a netbook, a personal digital assistant (PDA), or the like.

The notification message reminder apparatus in the embodiments of this application may be an apparatus with an operating system. The operating system may be an Android operating system, may be an iOS operating system, or may be another possible operating system, which is not specifically limited in this embodiment of this application.

The notification message reminder apparatus provided in the embodiments of this application is capable of implementing various processes implemented by the notification message reminder apparatus in the method embodiments of FIG. 1 to FIG. 4. To avoid repetition, details are not described herein again.

As shown in FIG. 6, an embodiment of this application further provides an electronic device, including a processor 620, a memory 610, and a program or instructions stored in the memory 610 and capable of running on the processor 620. When the program or the instructions are executed by the processor 620, the processes of the foregoing embodiments of the foregoing notification message reminder method are implemented, with the same technical effect achieved. To avoid repetition, details are not described herein again.

It should be noted that the electronic device in this embodiment of this application includes the foregoing mobile electronic device and the foregoing non-mobile electronic device.

Figure 7:
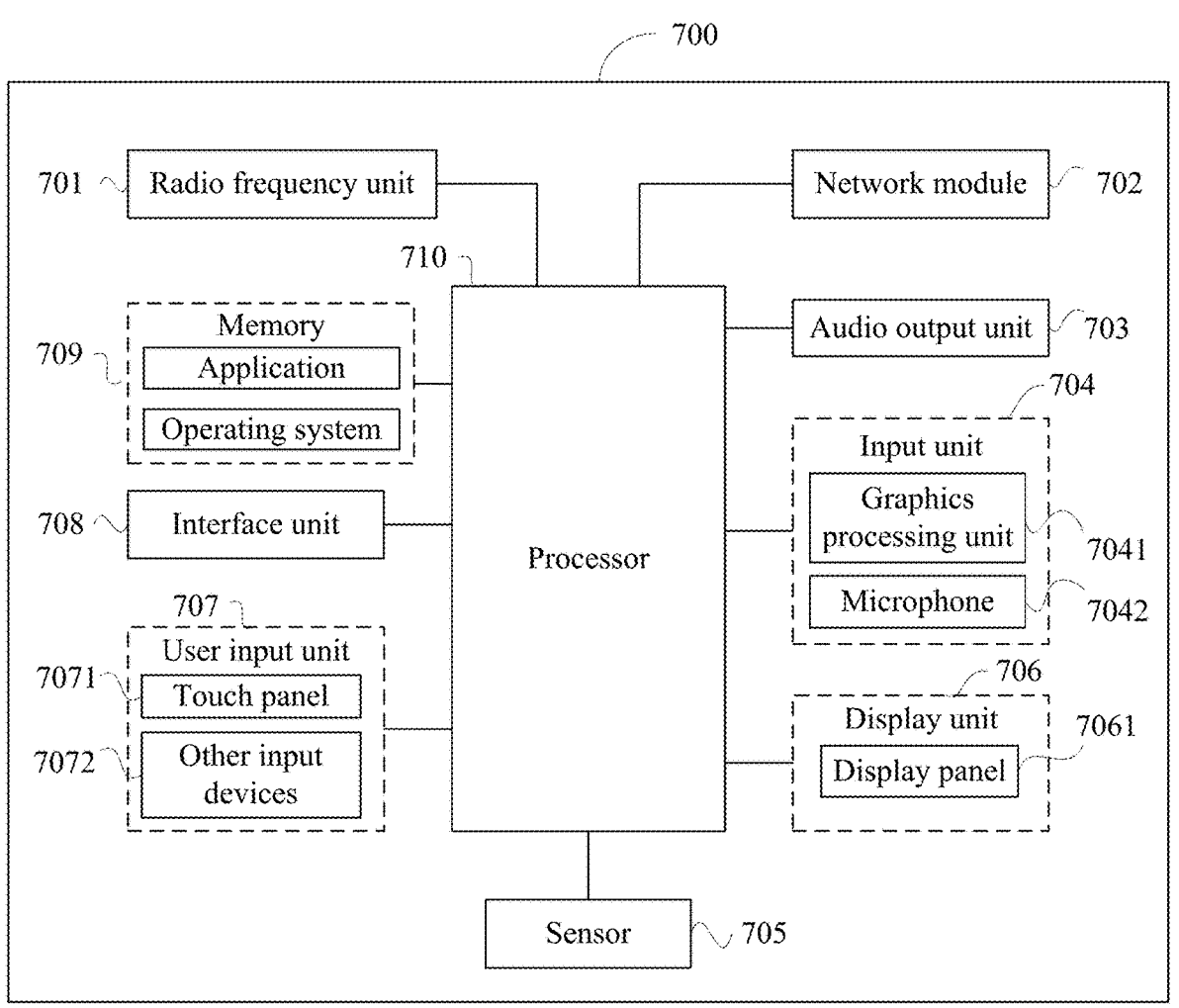
FIG. 7 is a second schematic diagram of hardware of an electronic device according to an embodiment of this application.

FIG. 7 is a schematic diagram of a hardware structure of an electronic device for implementing an embodiment of this application.

The electronic device 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

A person skilled in the art can understand that the electronic device 700 may further include a power supply (such as a battery) that supplies power to the components. The power supply may be logically connected to the processor 710 via a power management system, so that functions such as charge and discharge and power consumption management are implemented via the power management system. A structure of the electronic device shown in FIG. 7 does not constitute a limitation on the electronic device. The electronic device may include more or fewer components than those shown in the figure, or combination of some components, or the components disposed differently. Details are not described herein again.

The network module 702 is configured to receive a first notification message.

The processor 710 is configured to control a lens to move according to a target reminder scheme corresponding to a target application, where the target application is an application corresponding to the first notification message.

According to the electronic device provided in this embodiment of this application, the lens installed on a pan-tilt module moves to implement a message reminder, which implements a brand-new lens interaction, attracts less attention of others, and has good privacy.

In some embodiments, the processor 710 is further configured to: in a case that the lens is facing upward, control the lens to move according to the target reminder scheme corresponding to the target application.

In some embodiments, the processor 710 is further configured to: in a case that a mobile terminal is in a silent reminder state, control the lens to move according to the target reminder scheme corresponding to the target application; and in a case that the mobile terminal is in a non-silent reminder state, output prompt information according to a target prompt manner.

In some embodiments, the processor 710 is further configured to: in a case that the lens installed on the pan-tilt module is facing upward, determine that the application corresponding to the first notification message is the target application; and control the lens to move according to the target reminder scheme.

In some embodiments, the electronic device may further include the following.

The input unit 704 is further configured to receive a first input of a user.

The processor 710 is further configured to determine the target application in response to the first input.

The input unit 704 is further configured to receive a second input of the user.

The processor 710 is further configured to determine, in response to the second input, the target reminder scheme associated with the target application.

In some embodiments, the processor 710 is further configured to: in a case of playing audio information, control the lens to move based on the audio information.

It should be noted that the electronic device 700 in this embodiment can implement the processes of the method embodiments in the embodiments of this application. To avoid repetition, details are not described herein again.

It should be understood that in this embodiment of this application, the input unit 704 may include a graphics processing unit (GPU) 7041 and a microphone 7042. The graphics processing unit 7041 processes image data of a static picture or a video obtained by an image capture apparatus (for example, a camera) in a video capture mode or an image capture mode. The display unit 706 may include a display panel 7061. The display panel 7061 may be configured in a form of a liquid crystal display, an organic light-emitting diode, or the like. The user input unit 707 includes a touch panel 7071 and other input devices 7072. The touch panel 7071 is also referred to as a touchscreen. The touch panel 7071 may include two parts: a touch detection apparatus and a touch controller. The other input devices 7072 may include but are not limited to a physical keyboard, a functional button (such as a volume control button or a power on/off button), a trackball, a mouse, and a joystick, which are not further described herein. The memory 709 may be configured to store a software program and various data, including but not limited to an application program and an operating system. The processor 710 may be integrated with an application processor and a modem processor. The application processor mainly processes an operating system, a user interface, an application program, and the like. The modem processor mainly processes wireless communication. It can be understood that the modem processor may not be integrated in the processor 710.

An embodiment of this application further provides a readable storage medium, where the readable storage medium stores a program or instructions, and when the program or the instructions are executed by a processor, the processes of the foregoing embodiments of the notification message reminder method are implemented, with the same technical effect achieved. To avoid repetition, details are not described herein again.

The processor is a processor in the electronic device in the foregoing embodiment. The readable storage medium includes a computer-readable storage medium such as a computer Read-Only Memory (ROM), a Random Access Memory (RAM), a magnetic disk, or an optical disc.

An embodiment of this application further provides a chip, where the chip includes a processor and a communications interface, the communications interface is coupled to the processor, and the processor is configured to run a program or instructions to implement the processes of the foregoing embodiments of the notification message reminder method, with the same technical effect achieved. To avoid repetition, details are not described again herein.

It should be understood that the chip mentioned in this embodiment of this application may also be referred to as a system-level chip, a system chip, a chip system, or a system-on-chip.

It should be noted that, in this specification, the terms "include", "comprise", or any of their variants are intended to cover a non-exclusive inclusion, such that a process, method, article, or apparatus that includes a series of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and apparatus in the implementations of this application is not limited to performing functions in the order shown or discussed, but may also include performing the functions at substantially the same time or in a reverse order depending on the functions involved. For example, the method described may be performed in an order different from that described, and various steps may be also added, omitted, or combined. In addition, features described with reference to some examples may be combined in other examples.

According to the foregoing description of the implementations, a person skilled in the art can clearly understand that the method in the foregoing embodiments may be implemented by software in combination with a necessary universal hardware platform or by hardware only. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing implementations. The foregoing implementations are merely illustrative rather than restrictive. As instructed by this application, a person of ordinary skill in the art may develop many other forms without departing from the principle of this application and the protection scope of the claims, and all such forms fall within the protection scope of this application.

The invention claimed is:

1. A notification message reminder method, performed by a mobile terminal, wherein the mobile terminal comprises a pan-tilt module, the pan-tilt module is provided with a lens, and the method comprises:

receiving a first notification message; and in response to the mobile terminal being in a silent reminder state, controlling the lens to move according to a target reminder scheme corresponding to a target application, wherein the target application is an application corresponding to the first notification message, wherein the target reminder scheme comprises at least one of the following:

the lens moves according to a target trajectory;

the lens rotates according to a target angle; or the lens shakes according to the target angle; or controlling the lens to move according to the target reminder scheme corresponding to the target application comprises: controlling the lens to execute, according to the target reminder scheme, in one of the following cycles:

stopping after cycling a target number of times:

stopping after lasting for a target time;

stopping after continuously cycling until a target input of a user is received; or pausing after cycling the target number of times, and restarting after a target time period.

2. The notification message reminder method according to claim 1, wherein controlling the lens to move according to the target reminder scheme corresponding to the target application comprises:

in response to the lens being facing upward, controlling the lens to move according to the target reminder scheme corresponding to the target application.

3. The notification message reminder method according to claim 1, further comprising:

in response to the mobile terminal being in a non-silent reminder state, outputting prompt information according to a target prompt manner.

4. The notification message reminder method according to claim 1, wherein before receiving the first notification message, the method further comprises:

receiving a first input of a user;

determining the target application in response to the first input;

receiving a second input of the user; and determining, in response to the second input, the target reminder scheme associated with the target application.

5. The notification message reminder method according to claim 1, further comprising:

in response to playing audio information, controlling the lens to move based on the audio information.

6. A mobile terminal, comprising:

a pan-tilt module provided with a lens;

a memory storing a computer program; and a processor coupled to the memory and configured to execute the computer program to perform operations comprising:

receiving a first notification message; and when the mobile terminal is in a silent reminder state, controlling the lens to move according to a target reminder scheme corresponding to a target application, wherein the target application is an application corresponding to the first notification message, wherein the target reminder scheme comprises at least one of the following:

the lens moves according to a target trajectory;

the lens rotates according to a target angle; or the lens shakes according to the target angle;

or controlling the lens to move according to the target reminder scheme corresponding to the target application comprises: controlling the lens to execute, according to the target reminder scheme, in one of the following cycles:

stopping after cycling a target number of times;

stopping after lasting for a target time;

stopping after continuously cycling until a target input of a user is received; or pausing after cycling the target number of times, and restarting after a target time period.

7. The mobile terminal according to claim 6, wherein controlling the lens to move according to the target reminder scheme corresponding to the target application comprises:

when the lens is facing upward, controlling the lens to move according to the target reminder scheme corresponding to the target application.

8. The mobile terminal according to claim 6, wherein the operations further comprise:

when the mobile terminal is in a non-silent reminder state, outputting prompt information according to a target prompt manner.

9. The mobile terminal according to claim 6, wherein before receiving the first notification message, the operations further comprise:

receiving a first input of a user;

determining the target application in response to the first input;

receiving a second input of the user; and determining, in response to the second input, the target reminder scheme associated with the target application.

10. The mobile terminal according to claim 6, wherein the operations further comprise:

when playing audio information, controlling the lens to move based on the audio information.

11. A non-transitory computer-readable storage medium, storing a computer program, when the computer program is executed by a processor of a mobile terminal, wherein the mobile terminal comprises a pan-tilt module that is provided with a lens, causes the processor to perform operations comprising:

receiving a first notification message; and when the mobile terminal is in a silent reminder state, controlling the lens to move according to a target reminder scheme corresponding to a target application, wherein the target application is an application corresponding to the first notification message, wherein the target reminder scheme comprises at least one of the following:

the lens moves according to a target trajectory;

the lens rotates according to a target angle; or the lens shakes according to the target angle;

or controlling the lens to move according to the target reminder scheme corresponding to the target application comprises: controlling the lens to execute, according to the target reminder scheme, in one of the following cycles:

stopping after cycling a target number of times;

stopping after lasting for a target time;

stopping after continuously cycling until a target input of a user is received; or pausing after cycling the target number of times, and restarting after a target time period.

12. The non-transitory computer-readable storage medium according to claim 11, wherein controlling the lens to move according to the target reminder scheme corresponding to the target application comprises:

when the lens is facing upward, controlling the lens to move according to the target reminder scheme corresponding to the target application.

13. The non-transitory computer-readable storage medium according to claim 11, wherein the operations further comprise:

when the mobile terminal is in a non-silent reminder state, outputting prompt information according to a target prompt manner.

14. The non-transitory computer-readable storage medium according to claim 11, wherein before receiving the first notification message, the operations further comprise:

receiving a first input of a user;

determining the target application in response to the first input;

receiving a second input of the user; and determining, in response to the second input, the target reminder scheme associated with the target application.

15. The non-transitory computer-readable storage medium according to claim 11, wherein the operations further comprise:

when playing audio information, controlling the lens to move based on the audio information.

* * * * *